US011994925B2

(12) United States Patent
Sripada et al.

(10) Patent No.: US 11,994,925 B2
(45) Date of Patent: May 28, 2024

(54) POWER MANAGEMENT AND STAGGERING TRANSITIONING FROM IDLE MODE TO OPERATIONAL MODE

(71) Applicant: Marvell Asia Pte, Ltd., Singapore (SG)

(72) Inventors: Srinivas Sripada, Roseville, CA (US); Chia-Hsin Chen, Santa Clara, CA (US); Avinash Sodani, San Jose, CA (US); Atul Bhattarai, San Jose, CA (US); Nikhil Jayakumar, San Jose, CA (US)

(73) Assignee: Marvell Asia Pte Ltd, Singapore (SG)

( * ) Notice: Subject to any disclaimer, the term of this patent is extended or adjusted under 35 U.S.C. 154(b) by 318 days.

(21) Appl. No.: 16/947,446

(22) Filed: Jul. 31, 2020

(65) Prior Publication Data

US 2021/0318740 A1 Oct. 14, 2021

Related U.S. Application Data

(60) Provisional application No. 63/008,490, filed on Apr. 10, 2020.

(51) Int. Cl.
| | |
|---|---|
| *G06F 1/3203* | (2019.01) |
| *G06F 1/08* | (2006.01) |
| *G06F 1/10* | (2006.01) |
| *G06F 1/3228* | (2019.01) |
| *G06F 1/3234* | (2019.01) |
| *G06F 1/324* | (2019.01) |
| *G06F 1/3293* | (2019.01) |

(52) U.S. Cl.
CPC .............. *G06F 1/3203* (2013.01); *G06F 1/08* (2013.01); *G06F 1/10* (2013.01)

(58) Field of Classification Search
CPC .............. G06F 1/3203; G06F 1/08; G06F 1/10
See application file for complete search history.

(56) References Cited

U.S. PATENT DOCUMENTS

| | | | | |
|---|---|---|---|---|
| 6,526,517 | B1 * | 2/2003 | Miller | ........................ G06F 1/24 |
| | | | | 713/500 |
| 6,564,328 | B1 | 5/2003 | Grochowski et al. | |
| 6,983,387 | B2 * | 1/2006 | Boerstler | ................... G06F 1/06 |
| | | | | 713/322 |
| 9,366,724 | B1 * | 6/2016 | Carder | ........... G01R 31/318552 |
| 2002/0138777 | A1 | 9/2002 | Feierbach | |
| 2007/0106914 | A1 | 5/2007 | Muthukumar et al. | |
| 2008/0155280 | A1 * | 6/2008 | Hacking | ................ G06F 1/3253 |
| | | | | 713/300 |
| 2009/0070607 | A1 * | 3/2009 | Safford | .................. G06F 1/3234 |
| | | | | 713/320 |
| 2009/0265498 | A1 * | 10/2009 | Yamaoka | ............... G06F 13/364 |
| | | | | 710/305 |

(Continued)

*Primary Examiner* — Jaweed A Abbaszadeh
*Assistant Examiner* — Gayathri Sampath

(57) ABSTRACT

A system includes a first and a second group of cores in a multicore system. Each core of the first/second group is configured to process data. Each core within the first/second group is configured to enter into an idle state in response to being idle for a first/second period of time respectively. Every idle core in the first/second group is configured to transition out of the idle state and into an operational mode in response to receiving a signal having a first/second value respectively and further in response to having a pending operation to process.

33 Claims, 7 Drawing Sheets

(56) References Cited

U.S. PATENT DOCUMENTS

| | | | |
|---|---|---|---|
| 2010/0332869 A1* | 12/2010 | Hsin | G06F 1/3203 |
| | | | 713/340 |
| 2011/0314314 A1* | 12/2011 | Sengupta | G06F 1/3228 |
| | | | 713/323 |
| 2013/0198545 A1* | 8/2013 | Lee | G06F 1/3287 |
| | | | 713/323 |
| 2013/0268747 A1* | 10/2013 | Chang | G06F 9/4405 |
| | | | 713/2 |
| 2014/0181554 A1* | 6/2014 | Manne | G06F 1/3243 |
| | | | 713/323 |
| 2016/0098275 A1 | 4/2016 | Xie et al. | |
| 2016/0282930 A1* | 9/2016 | Ramachandran | G06F 1/3228 |
| 2016/0378168 A1* | 12/2016 | Branover | G06F 1/3203 |
| | | | 713/323 |
| 2017/0177046 A1* | 6/2017 | Garg | G06F 1/26 |
| 2018/0373287 A1* | 12/2018 | Al-Rawi | G06F 9/5044 |
| 2020/0257349 A1* | 8/2020 | Lobo | G06F 1/30 |

* cited by examiner

POWER MANAGEMENT AND STAGGERING TRANSITIONING FROM IDLE MODE TO OPERATIONAL MODE

CROSS-REFERENCE TO RELATED APPLICATIONS

This application claims the benefit and priority to the U.S. Provisional Patent Application No. 63/008,490, filed Apr. 10, 2020, which is incorporated herein in its entirety by reference.

BACKGROUND

Use of multicore systems have become prevalent in recent years especially in light of technologies such as artificial intelligence (AI) and machine learning (ML). It is appreciated that each of the cores within a multicore system include various components such as an on-chip memory, one or more processing units and/or logic circuits, etc. When multiple cores transition from an idle mode to a full operation, a large number of their components, e.g., logic circuits and the on-chip memories turn on simultaneously, causing a sudden power surge in a short amount of time. A sudden power surge may be characterized as Di/Dt which is a sudden increase in current in a short amount of time. It is appreciated that Di/Dt is referenced as power surge throughout this application. Unfortunately, addressing such a sudden surge in power in the short amount of time is difficult. Conventionally, a bulk capacitor on the chip has been used but the type of the bulk capacitor that can be used may be limited by the actual implementation of the chip design. Moreover, a significant drop on the voltage supply may occur if the capacitance is not large enough, impacting performance of the system.

The foregoing examples of the related art and limitations related therewith are intended to be illustrative and not exclusive. Other limitations of the related art will become apparent upon a reading of the specification and a study of the drawings.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1A:
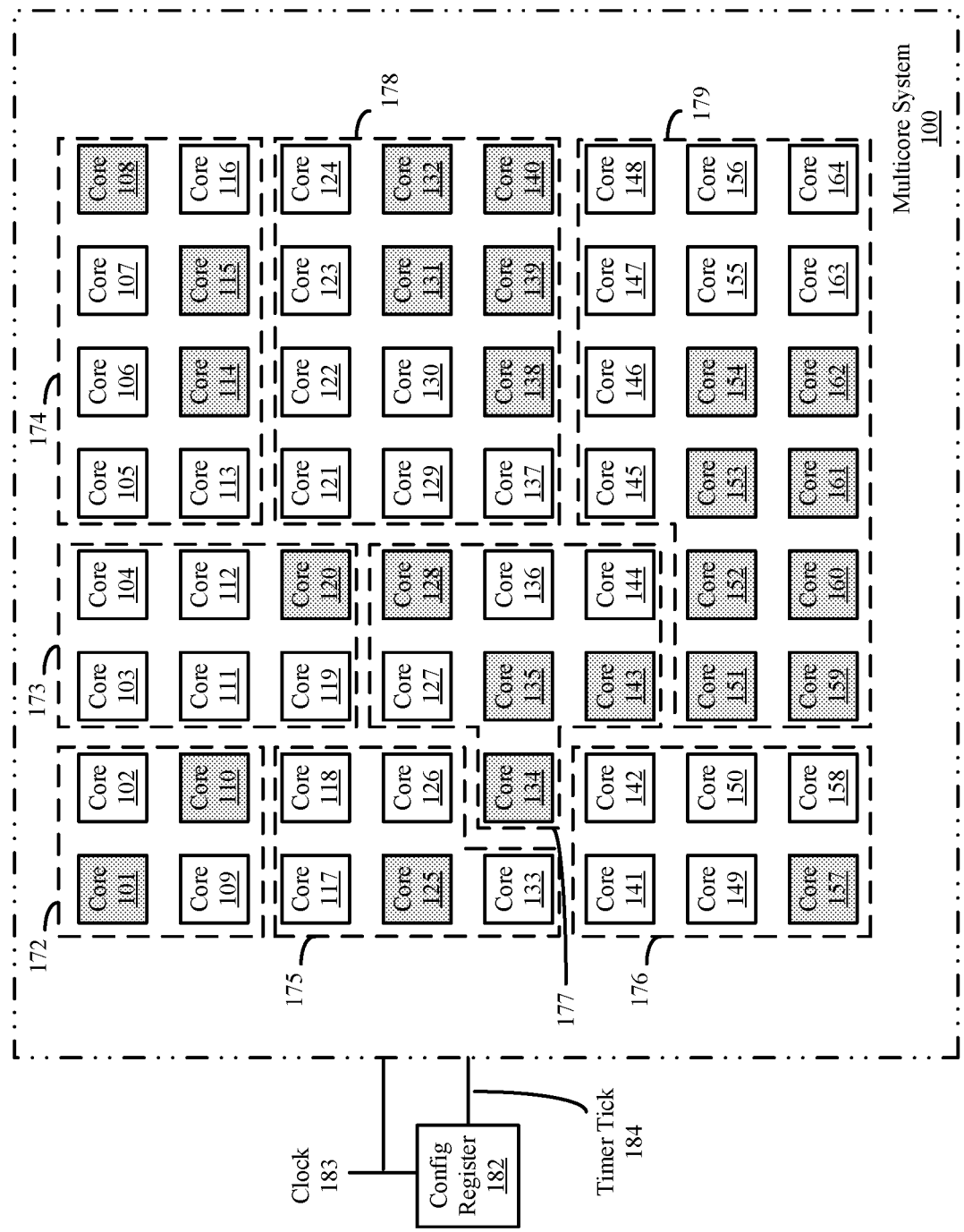
FIGS. 1A-1D depict an example of a diagram of a hardware-based architecture utilizing a staggering mechanism to transition idle cores to an operational mode according to an aspect of the present embodiments.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Before various embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein. It should also be understood that the terminology used herein is for the purpose of describing the certain concepts and the terminology is not intended to be limiting. Unless defined otherwise, all technical and scientific terms used herein have the same meaning as commonly understood in the art to which the embodiments pertain.

A new system and method to transition a plurality of cores of a multicore system from an idle state to an operational state is disclosed. In some nonlimiting examples, the plurality of cores of the multicore system may be grouped into a number of groups wherein each group may be associated with a stagger value or number, e.g., group number. It is appreciated that, in some embodiments, idle cores from different groups are prevented from transitioning into an operational mode at the same time even if they have a pending operation to process. However, all idle cores from the same group may transition to an operational mode simultaneously if the stagger value or number (i.e. group number) is reached. In other words, idle cores in different groups of a multicore systems transition to an operational mode in a staggered fashion, thereby limiting the sudden surge of power. It is appreciated that idle mode or state of a core may refer to a period that the core is inactive and not processing data whereas operational state or mode refers to a period of time that the core is active and processing data.

FIG. 1A depicts an example of a diagram of a hardware-based architecture utilizing a staggering mechanism to transition idle cores to an operational mode according to one aspect of the present embodiments. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

In the example of FIG. 1A, an architecture includes a multicore system 100 coupled to a configuration register 182. The configuration register 182 may configure the multicore system 100 in some embodiments. Each of these components in the architecture is a dedicated hardware block/component programmable by a user at a host (not shown) via software instructions for various operations. When the software instructions are executed, each of the hardware components becomes a special purposed hardware component for practicing certain machine learning functions. In some embodiments, the architecture 100 is on a single chip, e.g., a system-on-chip (SOC).

In the example of FIG. 1, the multicore system 100 includes a plurality of cores, usually arranged in multiple rows and columns. In this nonlimiting example, the multicore system 100 includes cores 101-108 in its first row, cores 109-116 in its second row, cores 117-124 in its third row, cores 125-132 in its fourth row, cores 133-140 in its fifth row, cores 141-148 in its sixth row, cores 149-156 in its seventh row, and cores 157-164 in its eight row. It is appreciated that the embodiments are described with respect to 64 cores arranged in 8 rows by 8 columns for illustrative purposes only and should not be construed as limiting the scope of the embodiments. For example, any number of cores and any number of rows/columns may be used. It is appreciated that the cores 101-164 may be configured to process data, e.g., in an inference engine for ML or AI.

It is appreciated that as a nonlimiting example, a sudden power surge occurs if cores 101-164 are idle and become operational at the same time or approximately the same time. It is appreciated that in order to prevent a sudden power surge resulting from transitioning idle cores to operational at the same time, the cores may be grouped and transitioned in staggered fashion. In this illustrative nonlimiting example, the configuration register 182 forms eight groups 172-179. In this nonlimiting example, group 172 includes cores 101-102 and 109-110, group 173 includes cores 103-104, 111-112, and 119-120, group 174 includes cores 105-108 and 113-116, group 175 includes cores 117-118, 125-126, and 133, group 176 includes cores 141-142, 149-150, and 157-158, group 177 includes cores 127-128, 134-136, and 143-144, group 178 include cores 121-124, 129-132, and 137-140, and group 179 includes cores 145-148, 151-156, and 159-164. It is appreciated that the groups may be formed to include any number of cores, e.g., a group may include between 1 core to 64 cores in this nonlimiting example. It is also appreciated that any number of groups may be formed and the number of groups formed is for illustrative purposes and should not be construed as limiting the scope of the embodiments. It is also appreciated that the groups may include the same number of cores or different number of cores and the number of cores per group as shown is for illustrative purposes and should not be construed as limiting the scope of the embodiments.

It is appreciated that in some embodiments, each core of the multicore system 100 receives a clock 183 signal. It is further appreciated that in some embodiments each core of the multicore system 100 receives a timer tick 184 signal. It is appreciated that a core enters an idle state if a core is idle for a certain period of time. For a nonlimiting example, core 101 in group 172 may enter an idle state if it is idle for a first amount of time, as determine by using the clock 183 signal. It is appreciated that core 120 from group 173 may enter an idle state if it is idle for a second amount of time, as determined by using the clock 183 signal. The first amount of time may be the same or different from the second amount of time. In other words, cores within each group may be programmed to enter an idle state after passage of the same amount of time being idle or different amount of time. For a nonlimiting example, one or more idle cores within group 172 may enter an idle state in response to being idle for $t_{172}$ period of time while one or more idle cores within group 173 may enter an idle state in response to being idle for tin period of time. It is appreciated that the amount of idle time for cores in each group to enter the idle state may be programmable, e.g., user programmable. In this nonlimiting example and for illustrative purposes cores 101 and 110 from group 172 have entered into the idle mode. It is appreciated that idle status of a core is illustrated in the figures as being grayed out. Core 120 from group 173 has entered into idle mode. Cores 108 and 114-115 from group 174 have entered into idle mode. Core 125 from group 175 has entered into idle mode. Core 157 from group 176 has entered into idle mode. Cores 128, 134-135, and 143 from group 177 have entered into idle mode. Cores 131-132 and 138-140 from group 178 have entered into idle mode and cores 151-154 and 159-162 from group 179 have entered into idle mode.

Figure 1B:
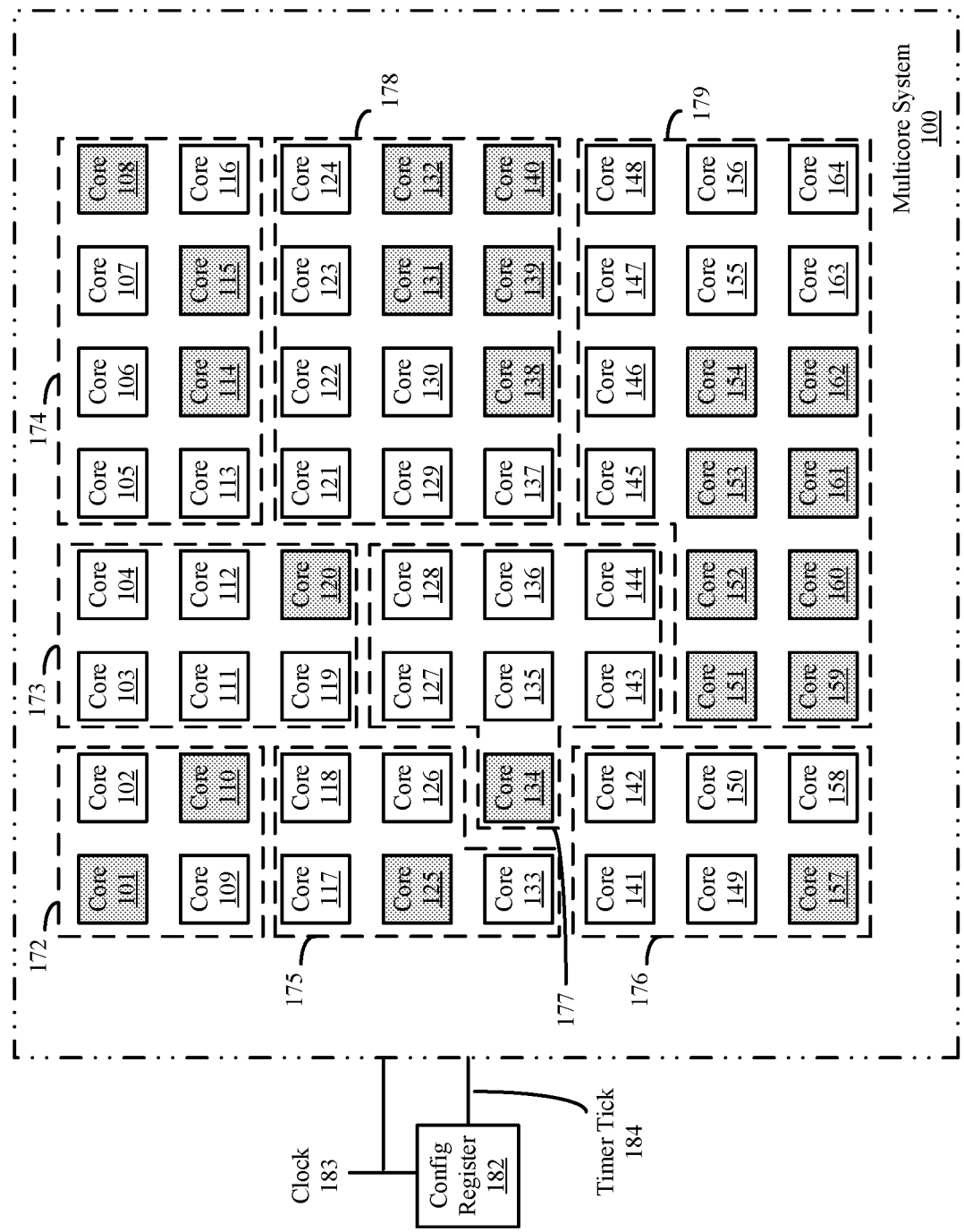

It is appreciated that in some embodiments, the timer tick 184 signal may be a tick generated after any number of clock pulses. For a nonlimiting example, in one nonlimiting example one tick is generated for every 50 clock pulses. It is appreciated that the groups as formed may be associated with a number of ticks. In other words, the timer tick 184 may be used to select a group from the multicore system 100. In one nonlimiting example, the timer tick 184 signal is used to select group 177. Once group 177 selected, idle cores within that group may transition to an operational mode. Referring now to FIG. 1B, transitioning of the idle cores within a selected group to an operational mode is illustrated. In some examples, the idle cores transition to the operational mode if their group is selected and if they have a pending operation to process. In this nonlimiting example, if group 177 is selected based on the timer tick 184 signal, then idle cores in group 177, hence cores 128, 134-135 and 143 (as shown in FIG. 1A) may transition to operational mode (as shown in FIG. 1B). In some nonlimiting examples the idle cores transition to operational mode if the group is selected and if the idle core(s) has a pending operation to process. In this example and for illustrative purposes, it is presumed that idle cores 128, 135, and 143 have a pending operation to process and as such when their group 177 is selected, idle cores 128, 135 and 143 transition from idle state to operational mode by generating a signal to transition them from idle mode to operational mode while the idle core 134 remains idle, as illustrated in FIG. 1B.

Figure 1C:
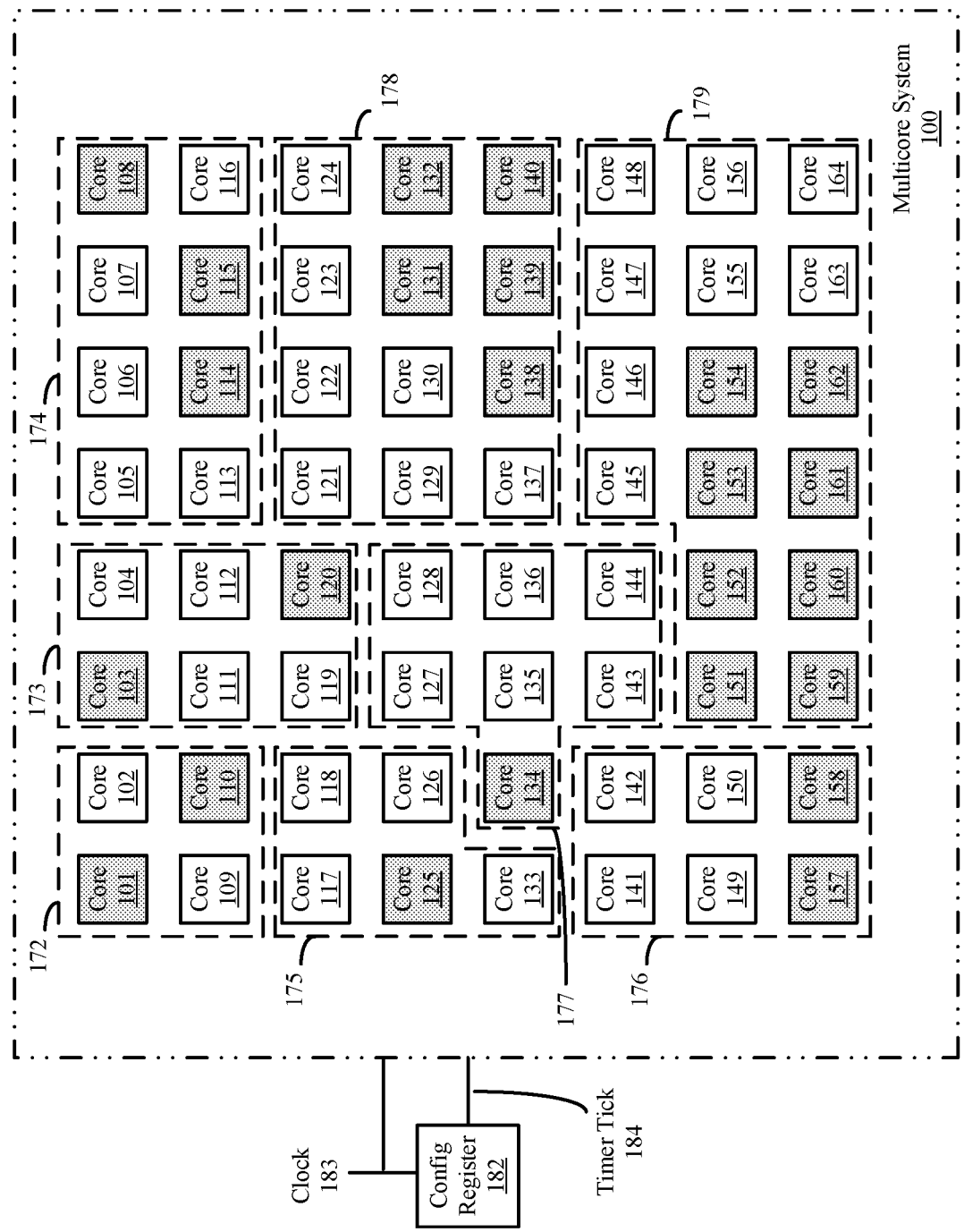
Figure 1D:
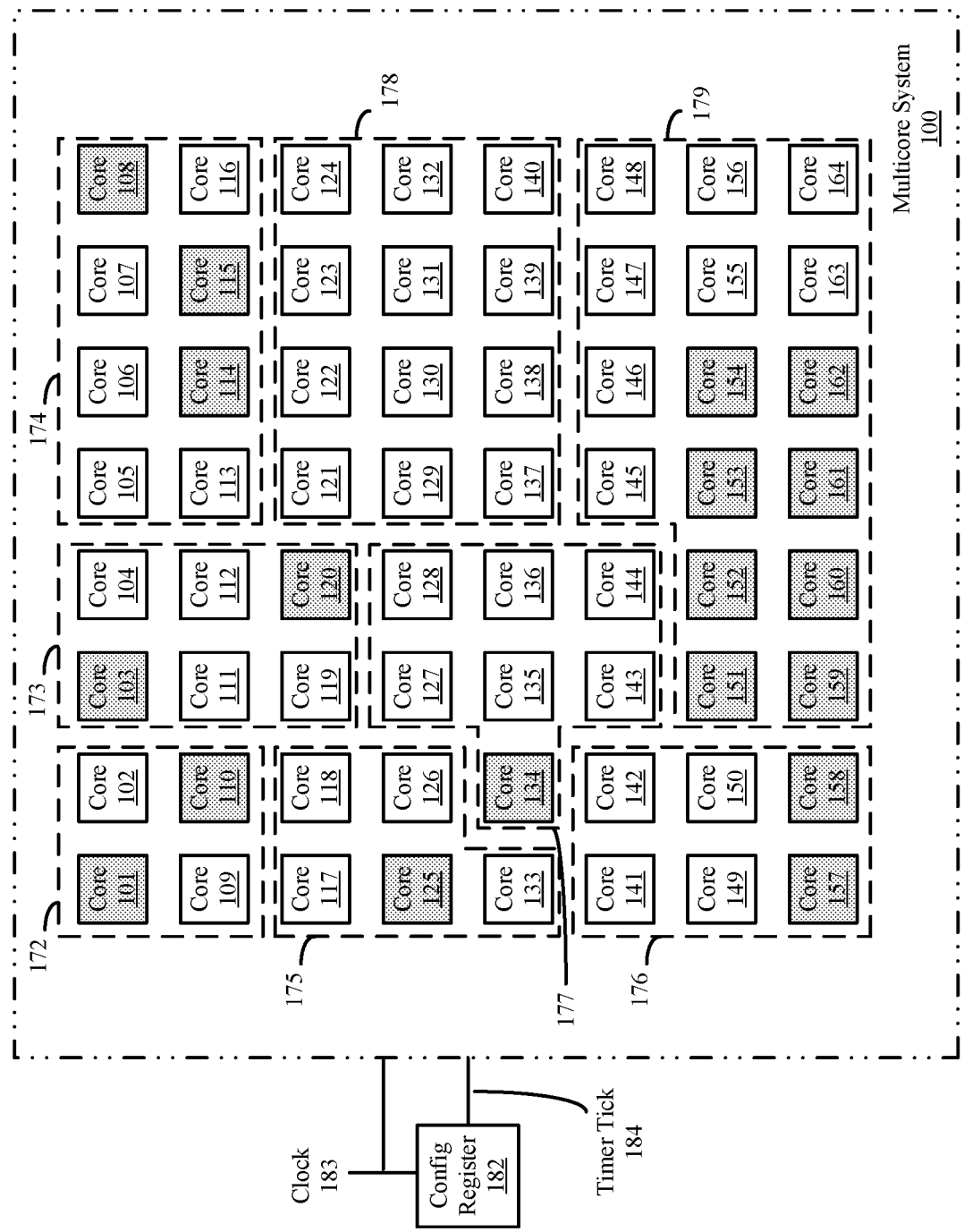

Referring now to FIG. 1C, some cores in the multicore system 100 enter into idle mode, e.g., cores 103 and 158, subsequent to the selection of group 177. Referring now to FIG. 1D, group 178 is selected based on the timer tick 184 signal. It is appreciated that group 178 is selected subsequent to group 177 selection. Similar to group 177, idle cores from group 178 may transition from idle state to operational mode since their group is selected. In this illustrative nonlimiting example, idle cores 131-132 and 138-140 transition out of the idle state and into operational mode by generating a wake signal. As illustrated idle cores from groups 177 and 178 transition from idle mode to operational mode in a staggered fashion, thereby reducing the sudden power surge. It is appreciated that over time other groups are also selected in a similar fashion and their respective idle cores may transition from idle mode to an operational mode. It is further appreciated that over time some operational cores may also enter into idle mode, as described with respect to FIG. 1C.

Figure 2A:
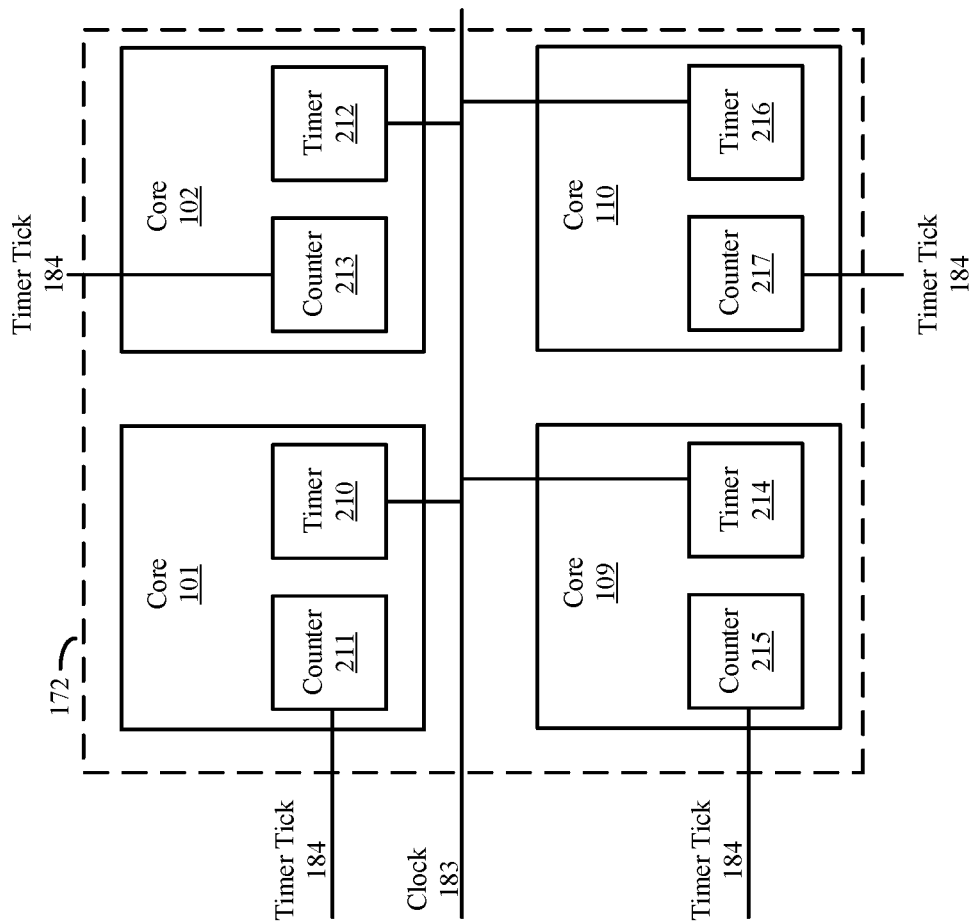
FIGS. 2A-2B depict nonlimiting examples for a group of cores to bring its idle cores into operational mode and a timing diagram according to an aspect of the present embodiments.
Figure 2B:
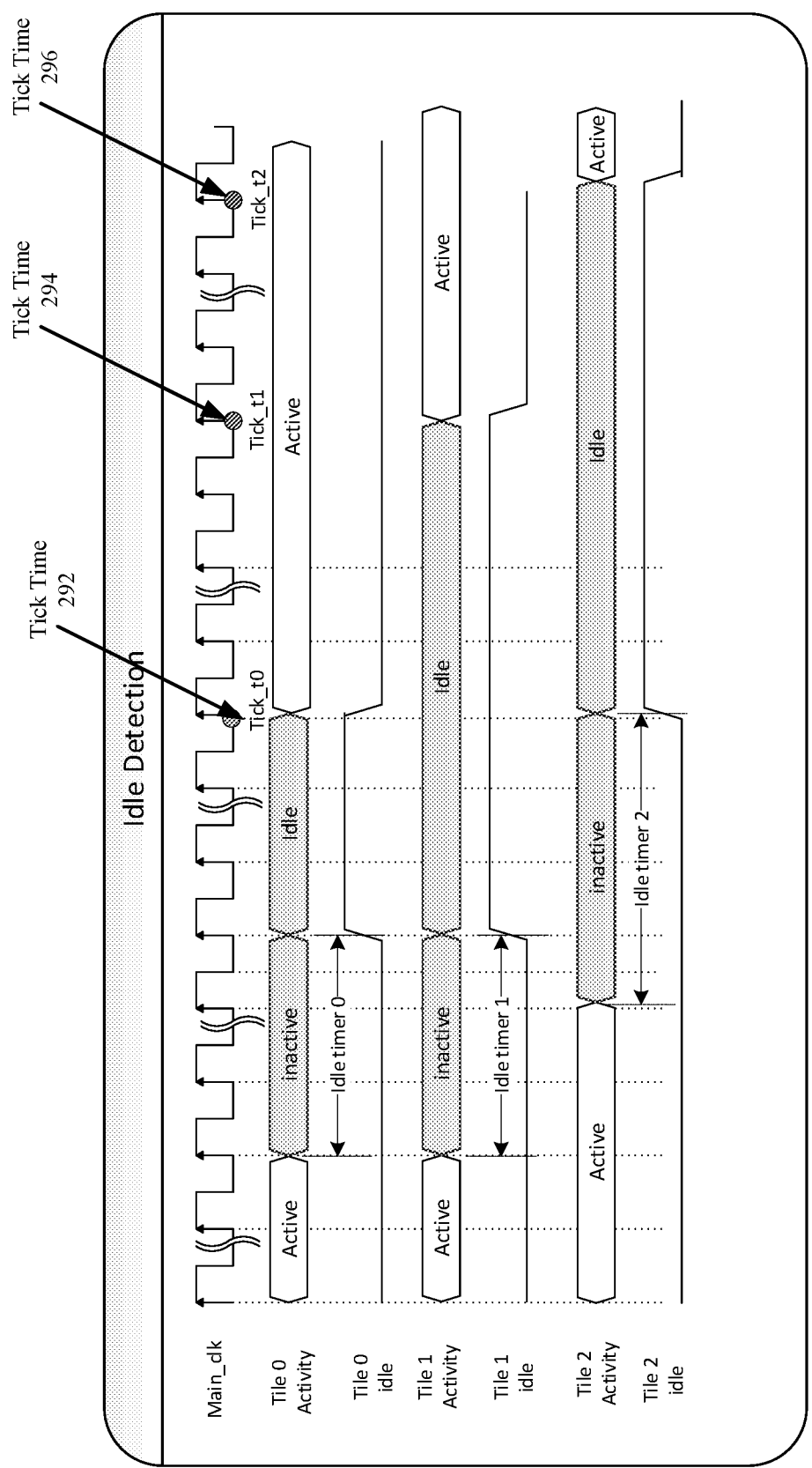

FIGS. 2A-2B depict nonlimiting examples for a group of cores to bring its idle cores into operational mode and a timing diagram according to one aspect of the present embodiments. It is appreciated that each core may include a counter and a timer. For example, group 172 is shown where each core includes a counter and a timer. In this nonlimiting example, the core 101 includes a counter 211 and a timer 210, the core 102 includes a counter 213 and a timer 212, the core 109 includes a counter 215 and a timer 214, and the core 110 includes a counter 217 and a timer 216.

As a nonlimiting example, group 172 may be associated with tick 1, group 173 may be associated with tick 2, group 174 may be associated with tick 3, and so forth. In other words, tick 1 is associated with selection of group 172, tick 2 is associated with selection of group 173, tick 3 is associated with selection of group 174, tick 4 is associated with selection of group 175, tick 5 is associated with selection of group 176, tick 6 is associated with selection of group 177, tick 7 is associated with selection of group 178, and tick 8 is associated with selection of group 179. It is appreciated that the tick value associated with each group may also be referred to as the stagger value because the tick value indicates the group which its idle cores can transition from idle mode to an operational mode.

In some embodiments, each core may use a counter to track the tick value. For a nonlimiting example, counters 211, 213, 215, and 217 may each be a 3-bit counter since 8 groups have been formed. When the first tick from timer tick 184 signal is received the counters in each core is incremented by 1. For example, when a first tick is received from the timer tick 184, the counters 211, 213, 215, and 217 from group 172 are incremented by 1 as well as the counter within each core of other groups. Since group 172 is associated with tick 1 then group 172 is selected. Accordingly, idle cores in group 172 may transition from idle mode to operational mode. For example, referring back to FIG. 1A cores 101 and 110 were idle and since group 172 is selected, cores 101 and/or 110 may transition into operational mode. It is appreciated that in some nonlimiting example, idle cores with a pending operation to process are transitioned into operational mode. For example, even though group 172 is selected, idle core 101 may transition to operational mode if it has a pending operation to process as opposed to idle core 110 that may remain in the idle mode if it does not have a pending operation to process. In one nonlimiting example, any idle core may transition to operational mode even if they have no pending operation to process as long as the group is selected. For example, in one nonlimiting example, idle cores 101 and 110 both transition to operational mode even though idle core 110 may not have a pending operation to process.

Similarly, when a next tick is received, the counters 211, 213, 215, and 217 are incremented from a value of 1 to 2 as well as the counters in other cores being incremented. It is appreciated that each counter in each core has the same value as other counters in other cores since they track the same tick value. As such, the group 172 is no longer selected but rather group 173 is selected. Similarly, when a next tick is received, the counters 211, 213, 215, and 217 are incremented from a value of 2 to 3 as well as the counters in other cores being incremented. As such, the group 173 is no longer selected but rather group 174 is selected. It is appreciated that the process is repeated until group 179 is selected, as reflected by counter value of 8. The next tick that is received changes the value of the counter from 8 to 1 therefore selecting group 172 again and the process continues.

It is appreciated that in some embodiments, the timers in each core tracks the amount of time that the core remains idle. For a nonlimiting example, timer 212 may track the amount of time that core 102 remains idle. If the amount of time that core 102 remains idle reaches a certain threshold, e.g., predetermined, user programmable, etc., then core 102 may transition to the idle state. It is similarly appreciated that each core in each group includes a timer that tracks the amount of time that the core is being idle and transitions the core to idle state if a certain threshold of time is reached. As discussed above, it is appreciated that in some embodiments, each group may be configured such that the cores within that group enter idle state based on a different threshold of time.

For a nonlimiting example, cores within group 172 may enter idle state if they are idle for a first period of time whereas group 173 may enter idle state if they are idle for a second period of time. It is further appreciated that in some embodiments, even cores within the same group may be configured to enter idle state based on being idle for different amount of times. For a nonlimiting example, core 101 may enter the idle state if it is idle for $t_1$ whereas core 110 may enter the idle state if it is idle for $t_2$ amount of time. The time may be measured using the clock 183 signal.

It is appreciated that in some embodiments, each group within the multicore system 100 may function similar to that of group 172 as described in FIG. 2A. Referring now to FIG. 2B an illustrative timing diagram for illustrative purposes is shown. As illustrated, tile 0 (also referred to as core) is initially active and enters into inactive mode for idle timer 0 and since it remains inactive for that period and passes the predetermined threshold it enters into idle mode. Tile 0 remains in idle mode until the tick time 292 is received associated with tile 0 group. As such, tile 0 may transition from idle mode to operational or active mode. Tile 1 is also initially active and becomes inactive for idle timer 1 period of time. Since tile 1 remains inactive for the threshold period it enters into idle state. However, tile 1 does not transition from idle mode to operational mode or becomes active until its associated group is selected, hence tick time 294 is received, at which point enters into the operational mode. It is appreciated that tile 2 is also initially active but after being inactive for idle timer 2 period of time it reaches its idle time threshold and enters into the idle state. However, tile 2 does not transition to operational mode or active mode until its associated group, hence tick time 296, is selected. Once tick time 296 is received, tile 2 transitions to operational mode. As illustrated, idle cores in different groups in the multicore system transition from idle state to operational state in a staggered fashion. As such, sudden surge of power is reduced and limited.

Figure 3:
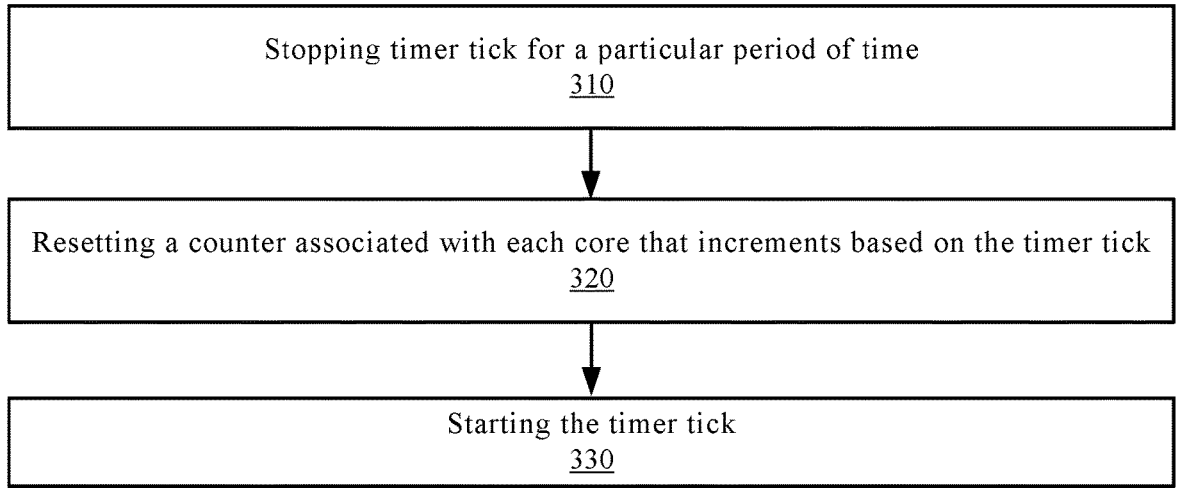
FIG. 3 depicts a flowchart of an example of a process for synchronizing the cores according to an aspect of the present embodiments.

FIG. 3 depicts a flowchart of an example of a process for synchronizing the cores according to one aspect of the present embodiments. At step 310, timer tick is stopped for a period of time. As such, the counter for each core does not receive a tick. At step 320, the counter for each core is reset. Accordingly, every counter holds the same value. At step 330, timer tick is started. Accordingly, the counters count the same value based on the tick. As such, different groups are selected at different time in order to their respective idle cores to transition to operational mode.

Figure 4:
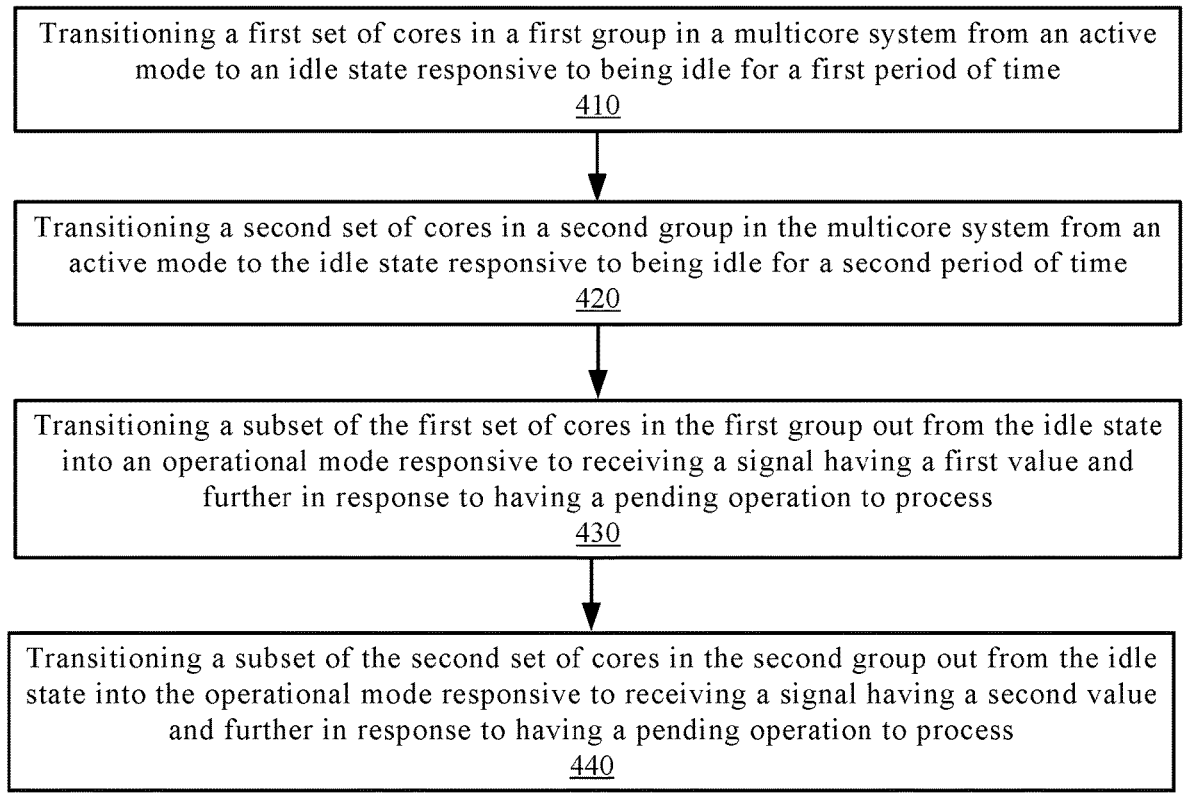
FIG. 4 depicts a flowchart of an example utilizing a staggering mechanism to transition idle cores to an operational mode according to an aspect of the present embodiments

FIG. 4 depicts a flowchart of an example utilizing a staggering mechanism to transition idle cores to an operational mode according to one aspect of the present embodiments. At step 410, a first set of cores in a first group in a multicore system is transitioned from an active mode to an idle state responsive to being idle for a first period of time. At step 420, a second set of cores in a second group in the multicore system is transitioned from an active mode to the idle state responsive to being idle for a second period of time. At step 430, a subset of the first set of cores in the first group out is transitioned from the idle state into an operational mode responsive to receiving a signal having a first value and further in response to having a pending operation to process. At step 440, a subset of the second set of cores in the second group is transitioned out from the idle state into the operational mode responsive to receiving a signal having a second value and further in response to having a pending operation to process.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Embodiments were chosen and described in order to best describe the principles of the invention and its practical application, thereby enabling others skilled in the relevant art to understand the claimed subject matter, the various embodiments and the various modifications that are suited to the particular use contemplated.

What is claimed is:

1. A system comprising:
   a first plurality of cores within a multicore system, wherein the first plurality of cores is associated with a first group; and
   a second plurality of cores within the multicore system, wherein the second plurality of cores is associated with a second group, wherein the first and the second plurality of cores are configured to process data,
   wherein each core of the first and the second plurality of cores receives a clocking signal, and wherein the first group is associated with a first number based on a first number of clock pulses of the clocking signal and wherein the second group is associated with a second number based on a second number of clock pulses of the clocking signal,
   wherein a wake signal is generated for an idle core of the first group to move the idle core of the first group from an idle mode to an operational mode responsive to the clocking signal reaching the first number of clock pulses, and wherein a wake signal is generated for an idle core of the second group to move the idle core of the second group from the idle mode to the operational mode responsive to the clocking signal reaching the second number of clock pulses, wherein the idle core of the first group and the idle core of the second group reach the operational mode in a staggered fashion to limit a sudden power surge and wherein the idle core of the first group becomes active and capable of processing data in the operational mode and wherein the idle core of the second group becomes active and capable of processing data in the operational mode, and wherein two idle cores within the first plurality of cores transition out of the idle mode into the operational mode if the first number of clock pulses is reached and further if the two idle cores have a pending operation to process.

2. The system of claim 1, wherein the wake signal for the idle core of the first group is generated responsive to the clocking signal reaching the first number of clock pulses and if the idle core of the first group has an operation to process.

3. The system of claim 1, wherein moving the idle core of the first group to the operational mode and moving the idle core of the second group to the operational mode occurs staggered in time and based on a number of clock pulses of the clocking signal.

4. The system of claim 1, wherein each core of the first group and the second group comprises a counter configured to count a number of the clock pulses of the clocking signal, and wherein the wake signal for the idle core of the first group is generated when the count of the clock pulses reaches the first number of clock pulses, and wherein the wake signal for the idle core of the second group is generated when the count of the clock pulses of the clocking signal reaches the second number of clock pulses.

5. The system of claim 1, wherein a wake signal is generated for more than one idle core in the first group responsive to the clock pulses of the clocking signal reaching the first number of clock pulses.

6. The system of claim 5, wherein a wake signal is generated for more than one idle core in the second group responsive to the clock pulses of the clocking signal reaching the second number of clock pulses.

7. The system of claim 6, wherein the wake signal for the more than one idle core in the first group is generated at a different time than from the wake signal for the more than one idle core in the second group.

8. The system of claim 1, wherein the first number of clock pulses and the second number of clock pulses are user programmable.

9. The system of claim 1, wherein each core of the first group comprises a timer configured to track a duration that the each core of the first group is idle, and wherein the each core in the first group that is idle for a first predetermined amount of time enters into an idle state based on the clocking signal.

10. The system of claim 9, wherein each core of the second group comprises a timer configured to track a duration that the each core of the second group is idle, and wherein the each core in the second group that is idle for a second predetermined amount of time enters into an idle state based on the clocking signal.

11. The system of claim 10, wherein the first predetermined amount of time is different from the second predetermined amount of time.

12. The system of claim 10, wherein the first predetermined amount of time and the second predetermined amount of time are user programmable.

13. A system comprising:
    a first core within a multicore system, wherein the first core receives a clocking signal and a timer tick signal, wherein the first core includes:
       a first timer configured to track an amount of time that the first core is idle and wherein the first timer generates an idle signal to cause the first core to enter into an idle mode responsive to the amount of time reaching a first threshold of time;
       a first counter configured increment in response to each tick of the timer tick signal, wherein a trigger signal is generated to cause the first core to transition out of the idle mode if the first core is in idle mode and if a value of the first counter reaches a first stagger value; and
    a second core within the multicore system, wherein the second core receives the clocking signal and the timer tick signal, wherein the first core and the second core are configured to process data,
    wherein the second core includes:
       a second timer configured to track an amount of time that the second core is idle and wherein the second timer generates an idle signal to cause the second core to enter into an idle mode responsive to the amount of time reaching a second threshold of time;
       a second counter configured increment in response to each tick of the timer tick signal, wherein a trigger signal is generated to cause the second core to transition out of the idle mode if the second core is in idle mode and if a value of the second counter reaches a second stagger value, wherein the first core and the second core transition out of the idle mode in a staggered fashion to limit a sudden power surge if the first core and the second are within different groups within the multicore system, and wherein the first core and the second core transition out of the idle mode simultaneously if the first core and the second core are within a same group within the multicore system and further if the second counter reaches the second stagger value at a same time that the first counter reaches the first stagger value.

14. The system of claim 13, wherein each tick for the timer tick signal is associated with a number of clock pulses of the clocking signal.

15. The system of claim 13, wherein the first threshold of time is different from the second threshold of time.

16. The system of claim 15, wherein the first threshold of time and the second threshold of time are user programmable.

17. The system of claim 13, wherein the first stagger value is different from the second stagger value.

18. The system of claim 17, wherein the first stagger value and the second stagger value are user programmable.

19. The system of claim 13, wherein the first core and the second core are prevented from transitioning from an idle mode to an operational mode at a same time.

20. The system of claim 13, wherein the trigger signal is generated to cause the first core to transition out of the idle mode if the first core is in idle mode and if the value of the first counter reaches the first stagger value and further if the first core has an operation to process, and wherein the trigger signal is generated to cause the second core to transition out of the idle mode if the second core is in idle mode and if the value of the second counter reaches the second stagger value and further if the second core has an operation to process.

21. A system comprising:
a first group of cores in a multicore system, wherein each core within the first group is configured to enter into an idle state in response to being idle for a first period of time; and
a second group of cores in the multicore system, wherein each core within the second group is configured to enter into an idle state in response to being idle for a second period of time, wherein the first group and the second group of cores are configured to process data,
wherein one idle core in the first group transitions out of the idle state into the operational mode in a staggered fashion with respect to one idle core in the second group transitioning out of the idle state into the operational mode, wherein the staggering occurs by an amount of time elapsing for the one idle core of the first group reaching a first value and by an amount of time elapsing for the one idle core of the second group reaching a second value and further when the one idle core of the first and the second groups have a pending operation to process to limit a sudden power surge, and wherein two idle cores within the first group transition out of the idle state into the operational mode if an amount of time elapsing for the two idle cores within the first group reach the first value and further if the two idle cores within the first group having a pending operation to process.

22. The system of claim 21, wherein the first period of time is different from the second period of time.

23. The system of claim 22, wherein the first period of time and the second period of time are user programmable.

24. The system of claim 21, wherein the first value is different from the second value.

25. The system of claim 24, wherein the first value and the second value are user programmable.

26. The system of claim 21, wherein idle cores in the first group and idle cores in the second group are prevented from transitioning from an idle mode to an operational mode at a same time.

27. A method comprising:
transitioning a first set of cores in a first group in a multicore system from an active mode to an idle state responsive to being idle for a first period of time;
transitioning a second set of cores in a second group in the multicore system from an active mode to the idle state responsive to being idle for a second period of time;
transitioning a subset of the first set of cores in the first group out from the idle state into an operational mode responsive to receiving a signal having a first value and further in response to having a pending operation to process and further in response to an amount of time that elapses for the subset of the first set of cores in the first group corresponds to the first value; and
transitioning a subset of the second set of cores in the second group out from the idle state into the operational mode responsive to receiving a signal having a second value and further in response to having a pending operation to process and further in response to an amount of time that elapses for the subset of the second set of cores in the second group corresponds to the second value, wherein the subset of the first set of cores in the first group transitions out of the idle state into the operational mode in a staggered fashion in comparison to the subset of the second set of cores in the second group transitioning out of the idle state into the operational mode to limit a sudden power surge, and wherein two idle cores within the second set of cores transition out from the idle state into the operational mode simultaneously if the two idle cores within the second set of cores receive the signal with the second value simultaneously.

28. The method of claim 27, wherein the first value is associated with the first group and wherein the second value is associated with the second group.

29. The method of claim 27, wherein the first period of time is different from the second period of time.

30. The method of claim 29, wherein the first period of time and the second period of time are user programmable.

31. The method of claim 27, wherein the first value is different from the second value.

32. The method of claim 31, wherein the first value and the second value are user programmable.

33. The method of claim 21, wherein idle cores in the first group and idle cores in the second group are prevented from transitioning from an idle mode to an operational mode at a same time.

* * * * *